Aug. 3, 1926.
P. FORKARDT
CHUCK
Filed June 23, 1924  2 Sheets-Sheet 1
1,594,716
Fig.1.
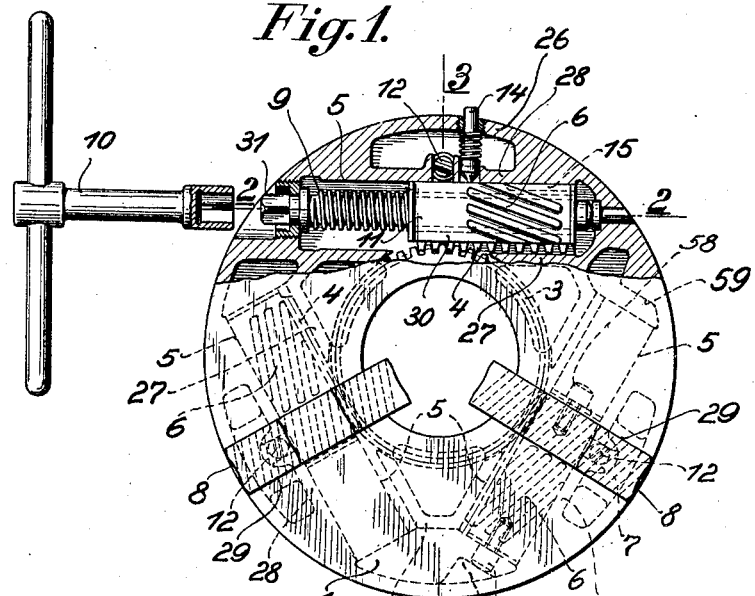
Fig.2.
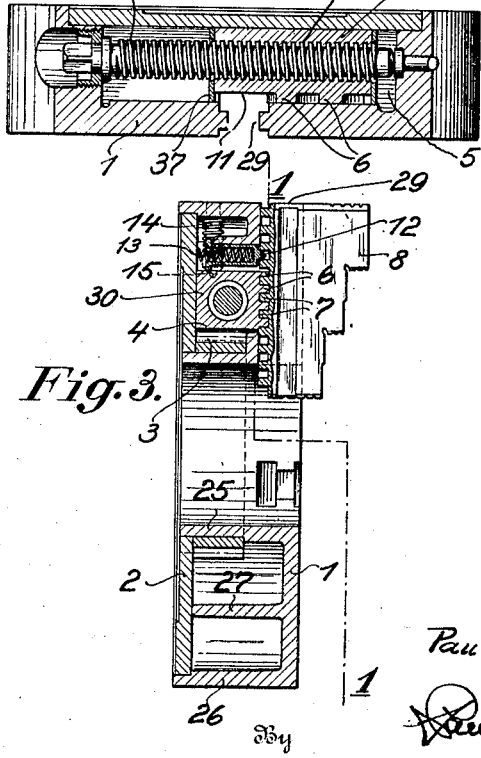
Fig.3.
Inventor
Paul Forkardt
By
Attorney Aug. 3, 1926.

P. FORKARDT

CHUCK

Filed June 23, 1924

1,594,716

2 Sheets-Sheet 2

Inventor
Paul Forkardt
By
Attorney

Patented Aug. 3, 1926.

1,594,716

UNITED STATES PATENT OFFICE.

PAUL FORKARDT, OF DUSSELDORF-OBERKASSEL, GERMANY.

CHUCK.

Application filed June 23, 1924, Serial No. 721,876, and in Switzerland February 6, 1924.

My invention relates to improvements in chucks, and more particularly in chucks of the type in which the jaws are advanced by means of transversely movable bars formed with rack teeth engaging in corresponding teeth of the jaws, and in which the jaws and bars are connected with each other for simultaneous operation by a suitable gearing. The object of the improvements is to provide a chuck of this type having maximum clamping power, and embodying novel and improved means of the type described for adjusting the jaws.

Figure 4:
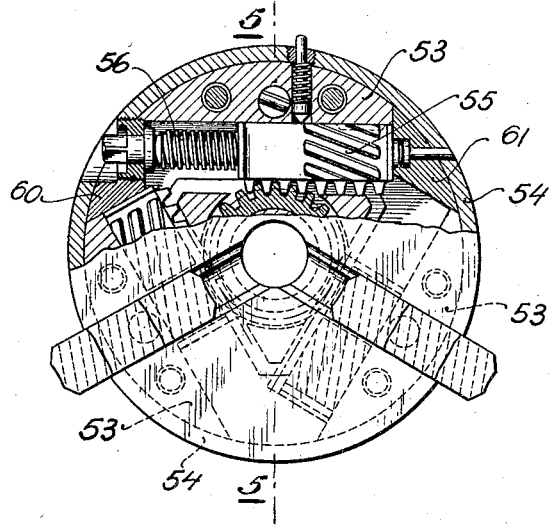
Figure 5:
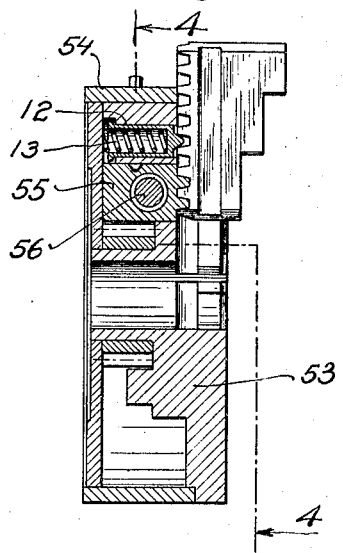

For the purpose of explaining the invention several examples embodying the same have been shown in the accompanying drawings in which the same reference characters have been used in all the views to indicate corresponding parts. In said drawings, Fig. 1 is an elevation of the chuck looking from the right in Fig. 3, the upper part of the figure being a section taken on the line 1—1 of Fig. 3, Fig. 2 is a horizontal section taken on the line 2—2 of Fig. 1, Fig. 3 is a cross-section taken on the line 3—3 of Fig. 1, Fig. 4 is an elevation partly in section on the line 4—4 of Fig. 5 showing a modification, and Fig. 5 is a section taken on the line 5—5 of Fig. 4.

In the example shown in Figs. 1 to 3, my improved chuck consists of an annular body or casing 1 having inner and outer flanges 25 and 26 and ribs 27 and 28, and closed at its rear side by an annular cover 2. The casing 1 is formed with three radial guide ways 29 having clamping jaws 8 slidable therein. At the rear of the guide ways 29 the ribs 27 and 28 provide guide-ways 5 which are disposed transversely of the guide ways 29 and tangentially of the flange 25, and which have bars 30 slidable therein. At their front sides the said bars are formed with teeth 6 running angularly of and over a part of the length of the bars and engaging corresponding angular teeth 7 formed on the rear or inner faces of the jaws 8. The bars 30 are also provided with rack teeth 4 which mesh with the teeth of a gear 3 rotatably mounted on the flange 25. One of the bars 30 is formed with an axial screw-threaded bore $9^a$ engaged by a screw 9 formed at one end with a square head 31 adapted to have a key 10 fitted thereon. The front jaw engaging faces of the bars 30 are formed with portions 11 having no teeth formed thereon and reduced so far that when moving the bars a sufficient distance inwardly the teeth of the bars and jaws are out of mesh, as is shown in Fig. 1, and in this position of the parts the jaws are held by bolts 12 located under the guideways 29 and formed with conical ends and yieldingly forced into engagement with the teeth of the jaws by springs 13. Each bolt 12 lies in alignment with one of the teeth 6 of the associated bar 30, and so as to engage between adjacent teeth 7 of the associated jaw 8 when the said teeth 7 of the jaw are out of mesh with the teeth 6 of the bar 30. When the jaws have been moved out of engagement with the bars 30 they can be further shifted outwardly by hand, the bolts 12 yielding rearwardly against the pressure of the springs 13 and riding over certain of the teeth 7 and being forced forwardly by the springs and into engagement between any of the other teeth 7 registering therewith when the jaws are moved outward to the desired position and allowed to come to a state of rest. Therefore the jaws can be shifted by hand a distance equal to the pitch of the teeth, or a multiple thereof, so that they are always in correct position for being engaged by the teeth 6 when again shifting the bars 30. Thus the jaws can be approximately set into any desired position, fine adjustment being effected by means of the teeth 6. One of the bars is formed at its opposite ends with contacts 58 adapted to engage stop surfaces 59 provided in the casing 1 for limiting the movements of the bars.

At one side of the casing a spring pressed bolt 14 is guided in a suitable bore in the rib 28 and the flange 26, the inner end of the bolt engaging in a groove 15 of the adjacent bar 30. As appears from Fig. 1 the length of the said groove is such that in the inoperative position of the said bar 30 the inner end of the bolt bears on the surface of the bar, so that its outer end projects beyond the casing, thus indicating that the teeth 6 and 7 are out of engagement with each other, and that the jaws can not be brought into clamping position without first advancing the bars 30.

The operation of the chuck is as follows: For fixing a blank to the chuck the screw 9 is first turned by means of the key 10 to shift the bars 30 and the jaws 8 out of engagement with each other, the shifting movement of the upper bar 30 being transmitted to the other ones by the rack teeth 4 and the gear 3. The jaws 8 are then shifted inwardly or outwardly by hand so far that their clamping faces approximately engage the blank placed between the same. Now the screw 9 is turned by means of the key 10 in a direction for shifting the bars 30 to bring their teeth 6 into engagement with the teeth 7 of the jaws, and by further turning the screw 9 the jaws 8 are shifted inwardly and into clamping engagement with the blank by the beveled teeth 6 of the bars 30 engaging in the beveled teeth 7 of the jaws.

In the modification shown in Figs. 4 and 5, the guideways for the racks are formed in a cast body 53 enclosed in a casing ring or shell 54. The rack 55 is adapted to be moved by a screw spindle 56 journaled at its opposite ends in bearing blocks 60 and 61, fitted in the casing.

My improved chuck gives high working efficiency and clamping power and its construction reduces wear to a minimum so that the cost of maintenance and repairs is low.

While in describing the invention reference has been made to particular examples embodying the same I wish it to be understood that my invention is not limited to the constructions shown in the drawings, and that various changes may be made in the general arrangement of the apparatus and the construction of its parts without departing from the invention.

I claim:—

1. In a chuck, the combination, with a body, of sliding jaws formed with teeth disposed angularly of the length of the jaws, sliding bars disposed transversely of the jaws and provided with rack teeth, said bars being also provided with reduced untoothed surfaces at one end thereof and with teeth disposed angularly of the length thereof and in longitudinal alinement with said reduced untoothed surfaces, said angularly disposed teeth of the bars adapted to mesh with the angularly disposed teeth of the jaws, a spur gear engaging the rack teeth of the bars, means engaging one of the bars for shifting said bar and through said gear shifting the other bars and the jaws, said bars being shiftable to an extent to move their angularly disposed teeth out of mesh with the teeth of the jaws and to bring their reduced untoothed surfaces into alinement with the teeth of the jaws, and automatic means for engaging the teeth of the jaws and yieldingly holding the jaws against movement when the bars are in the latter-named position.

2. In a chuck, the combination, with a body, of jaws formed with teeth disposed angularly of the length of the jaws, and bars disposed transversely of the jaws and formed with teeth arranged angularly of the length of the bars and engaging the angularly arranged teeth of the jaws, said bars being provided with rack teeth, a spur gear engaging the rack teeth of the bars, a screw screwing in one of said bars for shifting the same and constructed at one end for having a turning tool placed thereon, and bolts yieldingly mounted in said body in line with one of the teeth of each of the bars and in position for engagement with the teeth of the jaws when the said bars are moved out of engagement with the jaws.

3. In a chuck, the combination, with a body, of jaws formed with toothed faces having their teeth disposed angularly of the length of the jaws, and bars disposed transversely of the jaws and formed with toothed faces having their teeth arranged angularly of the length of the bars and engaging the teeth on the toothed faces of the jaws, one of said bars being provided over a part of its length with a groove, of means for simultaneously moving said bars, and a spring pressed bolt adapted for engaging in said groove and with the non-grooved part of the bar and projecting outside of said body.

In testimony whereof I affix my signature.

PAUL FORKARDT.